Dec. 22, 1959 J. R. CURRAN 2,918,087
VALVE
Filed May 14, 1956 3 Sheets-Sheet 1

INVENTOR.
John R. Curran
BY
Barlow & Barlow
ATTORNEYS.

Dec. 22, 1959  J. R. CURRAN  2,918,087
VALVE
Filed May 14, 1956  3 Sheets-Sheet 2

INVENTOR.
John R. Curran
BY
Barlow & Barlow
ATTORNEYS.

Dec. 22, 1959  J. R. CURRAN  2,918,087
VALVE
Filed May 14, 1956  3 Sheets-Sheet 3
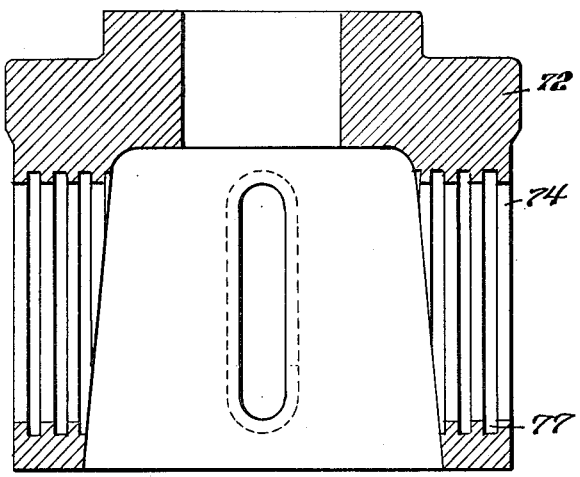
Fig. 7.
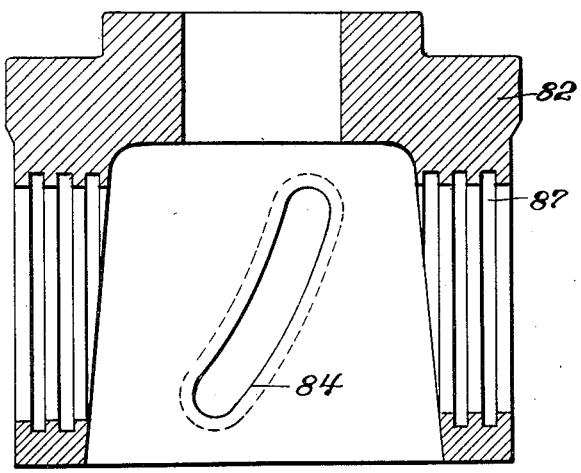
Fig. 8.
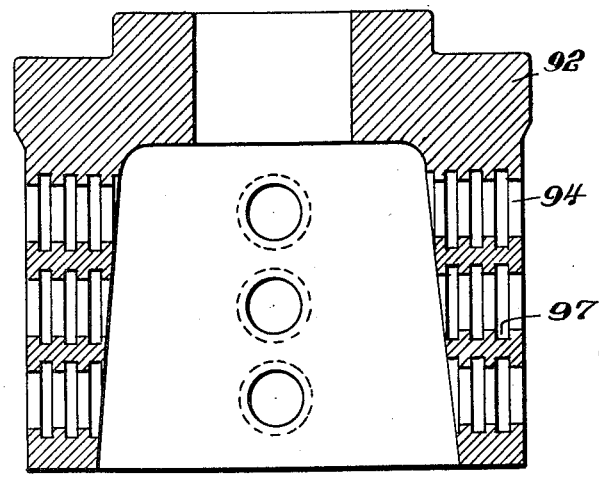
Fig. 9.
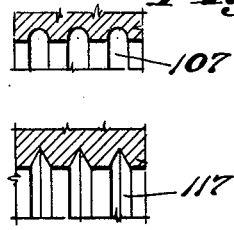
Fig. 10.
Fig. 11.
INVENTOR.
John R. Curran
BY
Barlow & Barlow
ATTORNEYS.

United States Patent Office 2,918,087
Patented Dec. 22, 1959

2,918,087

VALVE

John R. Curran, Cranston, R.I., assignor, by mesne assignments, to General Controls Co., Glendale, Calif., a corporation of California Application May 14, 1956, Serial No. 585,134

3 Claims. (Cl. 137—625.3)

This invention relates to a control valve wherein the parts are so arranged in the valve structure that cavitation is prevented and is a continuation-in-part of application Serial No. 352,126, filed April 30, 1953, which has since been abandoned.

In control valve structures used in the past, a major problem has presented itself from the cavitation that has resulted in the outlet port of the valve due to the pressure drop through the valve. A liquid flowing to a control valve which is under any pressure contains a certain potential energy. As this liquid is passed through the orifice of the valve, much of the potential energy is converted to kinetic energy, and when this conversion takes place, the static pressure of the liquid drops to a pressure less than the vapor pressure of the liquid and the liquid possesses a very high velocity. This action can be likened unto the nozzle of a fire hose wherein liquid passing through the hose at a considerable pressure is passed through a small orifice, the potential energy of the liquid being changed to kinetic energy as it passes out through the fire hose nozzle. If this action takes place in a restricted area, as in a valve structure housing, the result is that a mixture of liquid and vapor is present at the outlet port of the valve, which causes severe cavitation not only at the outlet port of the valve but also along the downstream piping. As the static pressure rises in the downstream piping and at the outlet port of the valve, the vapor bubbles collapse, causing implosions. Depending upon the pressures in use in the system, these implosions constitute an exchange of energy that not only causes noise and vibration of the valve structure and downstream piping but additionally tends to wear away the outlet port of the valve in addition to the downstream piping. The problem thus has ever been present to eliminate this cavitation action and has heretofore taken the form of what is commonly known in the trade as a step-cone valve. The step-cone valve, however, has several disadvantages, among which are the size which it must take in order to handle a given pressure and volume of liquid and the cost involved in producing this valve structure. The principle, however, behind the step-cone valve is that the potential energy of the incoming liquid rather than being converted to kinetic energy is converted to heat through the excessive friction action of the step-cone plug structure.

It is, therefore, the main object of the present invention to privide a valve plug structure which will convert the potential energy of the incoming liquid to heat to prevent cavitation.

It is a further object of the invention to construct a valve plug assembly which will secure the above desired characteristic as well as provide a universal valve plug structure which will lend itself to design changes to secure various flow versus lift characteristic curves without affecting the cavitation free feature.

It is a further object of the invention to construct a valve plug which may be readily adapted to existing valve structures and which is inexpensive to manufacture.

With these and other objects in view, this invention consists of certain novel features of construction as will be more fully described and particularly pointed out in the appended claims.

In the accompanying drawings:

Figures 4–9 illustrate various modified forms of a valve plug embodying the invention; and Figures 10 and 11 are partial sectional views of modified manners of treating the apertures through the plugs of Figures 4, 7, 8 and 9.

In proceeding with the invention, there is provided a valve body having inlet and outlet ports with valve plugs and seats therefor interposed therebetween. The valve plugs are formed as cup-shaped members and are bored with a plurality of round or elongated holes through the walls thereof, the surfaces of which are threaded or otherwise roughened to create turbulence when a liquid is passed therethrough. Valve seats are provided for these valve plugs, which are generally circular in shape, to snugly fit around the circumference of the cup-shaped valve plug members.

Figure 1:
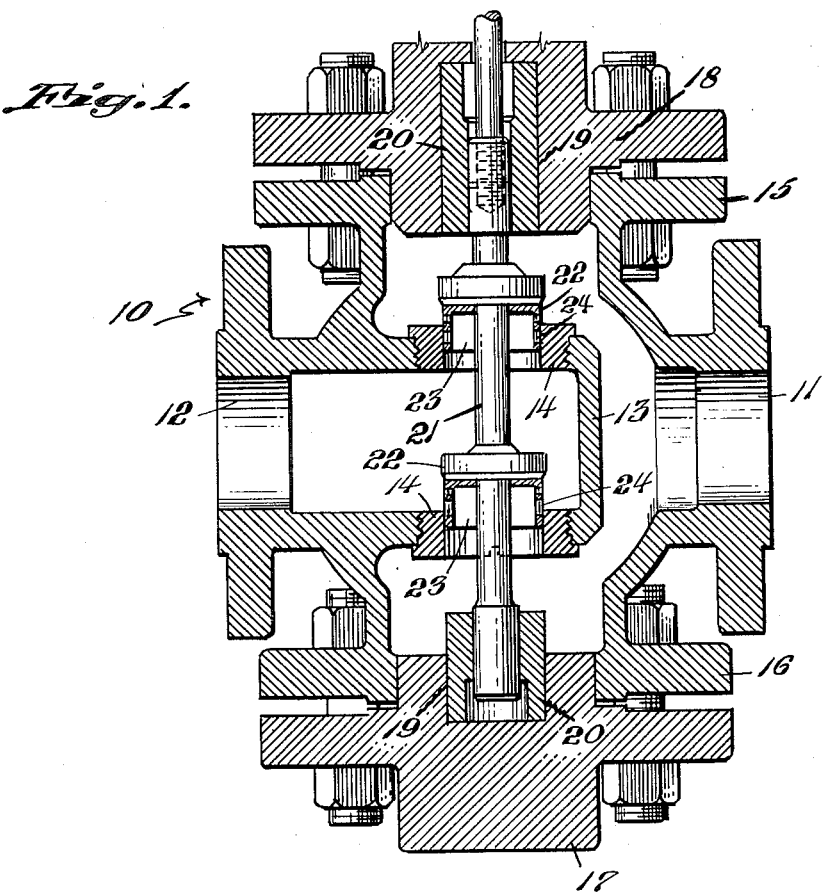
Figure 1 is a cut-away view showing the valve plug and valve seat.
Figure 2:
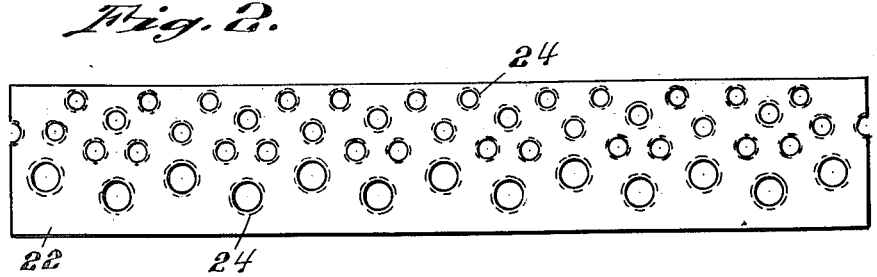
Figure 2 is an expanded view of the periphery of the valve plug.

In the drawing, 10 generally represents the valve body, which is provided with an inlet port 12 and outlet port 11. Between these ports there is formed a dividing wall 13, which carries seat rings 14 secured therein. Each end of the valve body 10 may be flanged as at 15 and 16, the portion adjacent 16 carrying a blind end 17 and the flange 15 carrying an actuating end 18. Each of these ends is suitably bored as at 19 and carries guide bushings 20. Slidably mounted in these guide bushings 20 is a valve actuating stem 21, which carries valve plugs 22 thereon. The valve plugs 22 are generally circular in shape and are recessed as at 23 to provide an inverted cup shape. The walls of each of these valve plugs are suitably machined with holes 24, which may be threaded with any of the well-known thread styles as at 25 or otherwise distorted such as by broaching to form a rough surface therein. As shown in Figure 2, the holes can be of varying size and are so arranged as to provide any desired lift versus flow characteristic for the application to which the valve will be put. Obviously, the arrangement of the holes may be varied and in the disclosed structure this is a simple operation which can be made in a universal sized valve plug.

Certain modifications to the valve plug structure are shown in Figures 4–11 which disclose other manners of creating a turbulence in the liquid passing through the valve plug.

Figure 4:
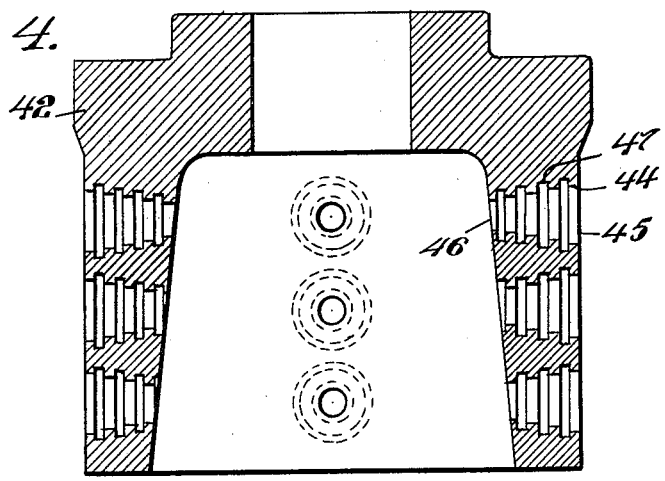

In Figure 4 I have shown a valve plug 42 which has a plurality of holes 44 therein. These holes are of tapering section and thus are larger at the mouth portion 45 than at the discharge portion 46. A plurality of non-joining grooves 47, which may be rectangular, as shown, or in accordance with Figures 10 and 11, are provided in the walls of the holes 44 to create an uneven passageway.

Figure 3:
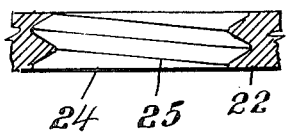
Figure 3 is a sectional view of one of the holes through the valve plug.
Figure 5:
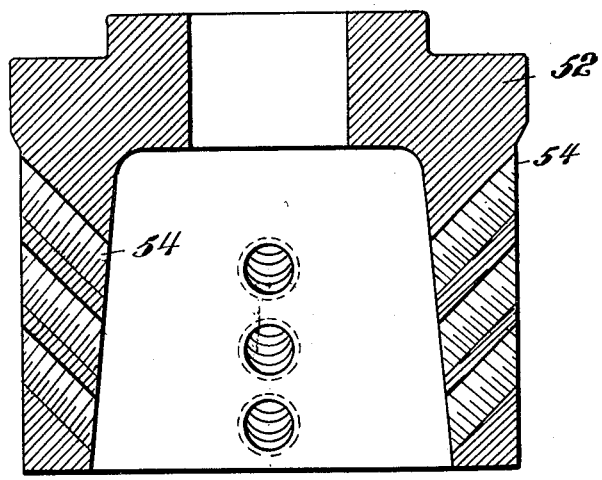

In Figure 5 I have shown another form of valve plug 52, in which a plurality of holes 54 have been provided, which may be helically threaded as a standard V, Acme type, or square. These holes, in distinction to those shown in Figures 2 and 3, have been provided in the plug at an angle to the reciprocating axis thereof. While the plug is shown as having sets of three holes at any vertical section thereof, it will be understood that any arrangement may be made, such as for instance the layout of Figure 2.

Figure 6:
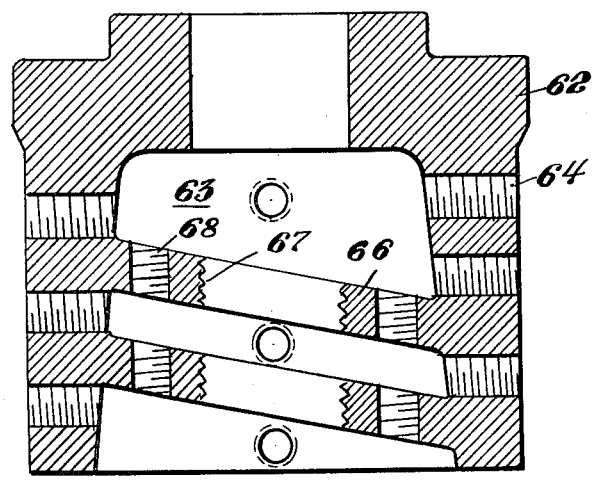

Figure 6 shows a valve plug 62 which is provided with a plurality of helically threaded holes 64 through the vertical wall thereof. In addition to these holes, the valve plug is shaped within the interior cup section 63 thereof with a spiral web 66. In order to provide passageways through this spiral web, it is shown as being bored with a large central hole 67 that is helically threaded and with a plurality of smaller holes 68 along the outside circumference thereof. The holes 64, 67, and 68 may be tapped with standard V, Acme type, or square threads. It will thus be apparent that in this embodiment there is secured a plurality of successive roughened surfaces not only through the wall of the plug as through the holes 64, but additionally through the holes 67 and 68 as the fluid traverses the spiral web 66.

In Figure 7 there is shown a plug 72 which, in lieu of providing a plurality of circular holes, is provided with a number of generally elongated slots 74 which are oriented so that their major axis is parallel with the axis of reciprocation of the plug. Each of the slots 74 is shown as being provided with a plurality of discontinuous grooves 77 in the wall thereof, which may be rectangular as shown or alternately may take the forms as shown in Figures 10 and 11.

A similar, but still further, modification is shown in Figure 8 wherein the valve plug 82 is provided with an elongated slot 84 which is similar to the slot 74 of Figure 7, except that in this case the slot is arranged so that its major axis is generally tilted to the axis of reciprocation of the plug and may be termed in elevation as a sausage-shaped slot. Slot 84 is, as in the previous embodiment, also provided with a plurality of grooves 87, which similarly may be rectangular as shown or in accordance with the showings of Figures 10 and 11.

Figure 9 shows a plug 92 which is provided with a plurality of holes 94 that may be disposed in any suitable manner in the wall of the plug to yield suitable lift vs. flow characteristics. The roughened wall surface of the holes in this embodiment has grooves 97 therein that are discontinuous from each other, the grooves being either rectangular, half round, or V type.

It will thus be seen that there is provided a valve in which the liquid will pass from the inlet 12 to the valve plug 22 and thence through the holes 24 to the outlet 11. During the passage of the liquid through the holes 24, the potential energy existing in the liquid due to the pressure thereof is converted to heat due to the friction afforded by the threading or other distortion of the normal smooth surface of the holes 24. While it might be suspected that the heat developed would deform the valve parts, actually the temperature rise in the valve plug 22 is not of a sufficient amount to cause any difficulty in the operation of the valve and is hardly detectable.

Although there is shown some preferred embodiments of the invention, it will be understood that it may take various other forms within the spirit of the appended claims. For instance, the valve plug may be made solid and the holes provided through the bore of an elongated valve seat. Thus, by a mere reversal of parts the desired conversion of potential energy to heat without cavitation may be secured.

I claim:

1. A valve comprising a casing having inlet and outlet ports, a valve seat interposed between said ports, a valve plug mounted for movement with respect to said valve seat, said plug being cylindrical with a closed end and having a plurality of threaded holes through the wall thereof, said valve seat embracing the wall of said plug to progressively close said holes.

2. A valve comprising a casing having inlet and outlet ports, a valve seat member mounted between said ports, a valve plug member having a closed end and a cylindrical wall mounted for reciprocal movement with respect to said seat member to control the flow between said ports, one of said members having a plurality of circular holes through the wall thereof, the wall surfaces of said holes being threaded, said surfaces adapted to create turbulent flow in fluid passing therethrough, the other of said member progressively closing said apertures in accordance with the relative position of said members.

3. A valve comprising a casing having inlet and outlet ports, a valve seat member mounted between said ports, a valve plug member having a closed end and a cylindrical wall mounted for reciprocal movement with respect to said seat member to control the flow between said ports, one of said members having a plurality of openings therethrough, each opening having a series of rectangularly cross-sectioned grooves to create turbulent flow in fluid passing therethrough, the other of said members progressively closing said openings in accordance with the relative position of said members.

References Cited in the file of this patent

UNITED STATES PATENTS

| | | |
|---|---|---|
| 1,013,093 | Reeve | Dec. 26, 1911 |
| 1,213,582 | Brown | Jan. 23, 1917 |
| 1,852,164 | Holzwarth | Apr. 5, 1932 |
| 2,231,959 | Sloan | Feb. 18, 1941 |
| 2,571,007 | Biggert | Oct. 9, 1951 |

FOREIGN PATENTS

| | | |
|---|---|---|
| 274,252 | Great Britain | July 21, 1927 |